United States Patent
Richman et al.

(10) Patent No.: US 8,405,524 B2
(45) Date of Patent: Mar. 26, 2013

(54) SEISMIC METHOD FOR VEHICLE DETECTION AND VEHICLE WEIGHT CLASSIFICATION

(75) Inventors: Michael S. Richman, Bedford, MA (US); Douglas S. Deadrick, Derry, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1118 days.

(21) Appl. No.: 12/339,225

(22) Filed: Dec. 19, 2008

(65) Prior Publication Data

US 2010/0157729 A1 Jun. 24, 2010

(51) Int. Cl.
G08G 1/04 (2006.01)

(52) U.S. Cl. ........ 340/943; 340/933; 340/939; 367/135; 367/136

(58) Field of Classification Search .............. 340/933, 340/934, 935, 938, 939, 943; 367/37–80, 367/135–136, 129
See application file for complete search history.

(56) References Cited

U.S. PATENT DOCUMENTS

| | | | | |
|---|---|---|---|---|
| 3,696,369 A | * | 10/1972 | Laymon et al. | 367/136 |
| 3,824,532 A | * | 7/1974 | Vandierendonck | 367/136 |
| 4,001,771 A | * | 1/1977 | Amrine et al. | 367/129 |
| 4,158,832 A | * | 6/1979 | Barnes, Jr. et al. | 340/943 |
| 4,387,450 A | | 6/1983 | Zachariadis | |
| 4,415,979 A | * | 11/1983 | Hernandez | 702/56 |
| 4,604,738 A | | 8/1986 | Aggarwal et al. | |
| 4,796,109 A | | 1/1989 | Sordello et al. | |
| 4,956,999 A | * | 9/1990 | Bohannan et al. | 73/587 |
| 4,975,891 A | | 12/1990 | Wineland et al. | |
| 5,107,250 A | * | 4/1992 | Pykett | 340/566 |
| 5,764,537 A | * | 6/1998 | Walter et al. | 702/179 |
| 7,006,927 B2 | | 2/2006 | Yakhini et al. | |
| 7,038,577 B2 | | 5/2006 | Pawlicki et al. | |
| 7,136,079 B2 | * | 11/2006 | Luo et al. | 345/611 |
| 7,203,132 B2 | * | 4/2007 | Berger | 367/129 |
| 2002/0190856 A1 | * | 12/2002 | Howard | 340/531 |
| 2004/0098198 A1 | * | 5/2004 | McGirr | 702/2 |

* cited by examiner

*Primary Examiner* — Mohammad Ghayour
*Assistant Examiner* — Nay Tun
(74) *Attorney, Agent, or Firm* — Daniel J. Long; Robert K. Tendler

(57) ABSTRACT

A system is provided for detecting the passage of vehicles and the classification thereof by weight using geophone outputs and a unique density measurement in which the number of peaks of the geophone signal above a predetermined threshold over a number of time frames indicates the presence of a vehicle, with the number of time frames in which the density exceeds the threshold indicating whether the vehicle is a heavy vehicle such as a tank, or a light vehicle such as a car, with the threshold eliminating both manmade and natural noise, as well as distinguishing seismic vibrations due to personnel and animals. In one embodiment, various thresholds are utilized to detect the onset of vehicle presence and the end of the event.

11 Claims, 12 Drawing Sheets

SEISMIC METHOD FOR VEHICLE DETECTION AND VEHICLE WEIGHT CLASSIFICATION

STATEMENT OF GOVERNMENT INTEREST

This invention was made with United States Government support under Contract No. H94003-05-C-0507. The United States Government has certain rights in this invention.

FIELD OF INVENTION

This invention relates to the detection and the classification of vehicles or more particularly to the utilization of low cost, low power consumptive geophones for detection and classification purposes.

BACKGROUND OF THE INVENTION

In the past, cameras and radars have been used to detect troop movements and presence of vehicles, be they light weight vehicles or tanks and bulldozers.

In order to surveil a given area, these sensors are scattered about, with the sensor providing information as to its location and sensed value. However camera and radar sensors require large amounts of power, both for the sensing operation and for the transmitting operation.

These sensors are normally battery powered and these types of sensors may last less than a day. On the other hand if one is seeking to detect vehicles using a geophone, geophones are very long lifetime devices because the geophone does not consume power. It is noted that geophones operate with a moving coil within a magnet so that the geophone generates its own electricity when the surface to which it is attached vibrates or shakes. Thus, geophones are in essence self-powered.

However, power is an issue when processing the output of geophones to determine that a target of interest exists. The high power consumption is in part due to the very large number of signals coming out of the transducer and in the past there has been a high computational load associated with characterizing geophone signals.

However if geophones can be utilized, then in terms of longevity one has a large advantage in terms of battery life that sensors can be deployed and be in place for long periods of time.

It has been thought that geophones do not have output signal characteristics that are distinct enough to be able to characterize what is shaking the ground. Certainly the geophone output is nowhere near as distinct as a camera image where one could see a picture and therefore determine not only that what is detected is a vehicle, but what type of vehicle it is. Thus picking out what constitutes a vehicle is quite subtle when utilizing geophone signals.

As a result, geophones were not utilized to detect vehicles. Nor were they utilized to detect the size of a vehicle, or to characterize a vehicle, for instance as being a passenger vehicle or a military vehicle.

It will be appreciated that geophones fundamentally measure ground vibration, usually in a frequency range between 15 hertz to 100 hertz. Because they are very low frequency signals the signatures of different weight vehicles have not heretofore offered enough information for vehicle detection and identity.

The reason that geophones have not been particularly useful up until the present time in determining the identity of the seismic source is that there are a large number of different objects which shake the ground. Not only can the ground shaking be produced by vehicles, wind blowing through a stand of trees causes the ground to shake, thus producing a local seismic phenomenon unrelated to vehicle detection. Also, electrical generators for example generate seismic noise which complicates vehicle detection due to the panoply of seismic noise sources, both natural and manmade.

For instance, assuming that there is a power outage in the area, diesel generators may kick in causing significant ground vibration. Thus, historically there has not been much benefit seen for using geophones. If a method could be provided that uses geophones for detecting and classifying vehicles, then their low cost, self-power, and low observability become attractive, especially since one can simply bury them in the ground to provide for stealthy surveillance.

Aside from the very low power consumption of the geophones, it is also desirable in any system to provide processors which minimize battery drain. It is noted that divide-by operations consume a considerable amount of power due to the number of floating point operations involved. Thus, processing which simply implements a mathematical formula for processing sensor outputs often results in too large a computational load.

SUMMARY OF THE INVENTION

Central to the subject invention is the unitization of geophones and a unique characteristic of the seismic signature of vehicles, exclusive of nearby personnel or other intermittent environmentally generated interference such as wind. Thus geophone outputs are used to provide for a low cost, low power drain system for sensing vehicles and classifying them.

In one embodiment, the geophones are in constant service with their outputs being polled periodically, for instance every two seconds, to generate a unique statistic which is used to characterize the source of the sensed vibrations. The statistic utilized is the density of the vibration signature referred heretofore as the density statistic. This corresponds to the number of peaks per time frame that exist above a given threshold. For those sources of vibration that have intermittent peaks, the number of peaks they generate do not exceed a threshold number of peaks and are disregarded. These intermittent peaks could be environmentally-produced vibrations of the ground such as by the wind, or could be from manmade noise.

However, it has been found that for a vehicle approaching a geophone there are a large number of regular peaks which if they exceed a predetermined threshold indicate the presence of the vehicle.

This type of system discriminates against, for instance vibration from tree rattling due to the wind blowing through a stand of trees. This is because the intermittent vibrations would not significantly accumulate over time.

On the other hand, for vehicles there will be a large number of detected vibration peaks as the vehicle approaches. What is involved in the subject invention is counting how many peaks are above a predetermined threshold for a given sample frame, for instance of two seconds, and then seeing how the number of peaks changes over time.

The counting of peaks exceeding a threshold over a given set of time periods eliminates vibrational noise caused by non-vehicle sources.

However, even when using the above unique density statistic, it has been found that one of the biggest issues is to separate out vehicles from personnel.

While detecting vehicle presence and type is central to the subject invention, it is also important that the subject system be able to simultaneously detect personnel and vehicles. To do this it is important to recognize that people generate impulsive energy as a seismic signal but at a much lower frequency rate, for instance 2 hertz, which is a very predictable signature. Note that the 2 Hz rate is based primarily on the human anatomy. In one embodiment, filters are utilized to filter out the 2 hertz signals to detect the movement of personnel. The subject system is effective to distinguish personnel from vehicles because it is noted that personnel who are unaware of the presence of geophones provide impulsive spikes that are very regular so that surveillance using geophones can detect and reject these low frequency regular spikes. If the geophones were visible, people might want to vary their gate to avoid detection.

Note also that when using geophones a large issue is that the seismic background threshold depends on the ground that one is measuring, with vibration amplitudes varying by as much as 50 dB.

Thus, as part of the subject invention there needs to be a way to be able to arrive at a reliable energy threshold from which one can form density statistics in terms of vibration peaks. Thus one needs to be able to characterize the background level.

More particularly, in the subject invention geophones are utilized to measure vibrations of the ground. The geophone output is processed in terms of measuring peaks above a predetermined threshold. By measuring density in terms of the number of peaks that exist above a threshold for a given time frame, one provides a low computational cost approach to vehicle detection and classification.

To provide for an appropriate threshold in one embodiment, a standard deviation is used to establish a background. In a preferred embodiment, in order to maintain a low computational cost, one estimates the standard deviation using an exponential average over time. This is provided by the following approach for computing the background signal level:

In one embodiment the subject system uses the standard deviation of the signal as a surrogate for the background signal level. Given a two second signal sampled at 256 Hz: $x_i, i=1, \ldots, 512$ The standard deviation is computed via $$s = \left( \frac{1}{n-1} \sum_{i=1}^{n} (x_i - \bar{x})^2 \right)^{\frac{1}{2}} \quad (1)$$

where $$\bar{x} = \frac{1}{n} \sum_{i=1}^{n} x_i$$

and n=512 for the two second signal.

The problem with this approach for a low power microcontroller is that one would like to avoid computing square roots if at all possible. Therefore, to estimate this quantity, one computes:

$$s\_estimate = 2 * \frac{1}{512} \sum_{i=1}^{512} |x_i|$$

Because 512 is a power of 2, instead of dividing by 512, one can obtain the result using a bit shift. As a result, this estimate uses only adds and multiplies, and can be implemented on a low power microcontroller.

To improve fidelity of the estimate, one exponentially averages the background value over time. This is accomplished via:

$$s\_avg\_estimate(i) = (1/128) * (s\_estimate + 127 * s\_avg\_estimate(i-1))$$

As before, 128 is a power of 2, so the division by 128 can be accomplished using a bit shift. Because this formula is recursive, one has to initialize the average background estimate appropriately. In one embodiment, this is done during the first 20 seconds of operation by defining the background estimate to be the smallest computed two second estimate observed during that period.

It is noted that with the subject algorithm and the stealthy placement of the geophones one is able to detect a vehicle as opposed to individuals, natural noise and manmade noise. The key to the subject invention is thus the above algorithm.

Note that the subject system takes into account the various characteristics of the ground and provides a background measurement for a given area from which is derived a threshold above which the peaks are measured. In one embodiment of the subject invention, the background measurement adapts over time. Thus for example, if one were unlucky enough to deploy the geophones and immediately have a vehicle present, the adaption over time permits detection of the vehicle.

Thus, the background measurement is not a static measurement of the background but is a measurement over some time window that essentially moves out. In one embodiment the above exponential average approach is utilized in which one keeps adding new measurements and then weights the old measurements less.

Also key to the subject measurement is the density statistic. It is one of the geophone signature attributes that has been discovered that the number of peaks over a time interval is relatively indifferent to the environment in which the sensor find itself.

In one embodiment, one computes the background level and then looks for samples of the geophone signals exhibiting peaks that for instance exceed four multiples of the background level over a fixed time period, for instance, a two second time period. One then counts the number of peaks that exceed the threshold over that time period.

If the wind is blowing through the trees or if the geophone is far removed from the vehicle, then one might not see any peaks when a vehicle starts approaching. As the vehicle comes closer it has been found that a good number of peaks are observed and the subject system starts scoring frames of the signal based on the number of peaks that one sees and how dense the peaks are in a given two second time frame.

Thus "density" does not mean an area under a curve, but rather the number of peaks exceeding the threshold in a time frame.

For a given two second frame, one might have a density score for that frame big enough to trigger vehicle detection. However, one characteristic of a vehicle is that since it is moving it will continue to generate impulses and start to build up a dense signal. Thus eventually one has a signal that has a large number of peaks that are exceeding the threshold over time.

For instance, in one embodiment, four frames are used in the analysis, such that if the density statistic exceeds the threshold for four two-second frames one declares that a vehicle is present. This would amount to eight seconds of vehicle movement. The eight second time period is not a problem because typically the geophones start to see vehicles at least 50 meters out. Even if a vehicle is moving a high rate of speed it will still be detected in the 8 second interval. This is because if a vehicle is traveling at a high rate of speed it produces more vibration and thus more and higher peaks that exceed the threshold. This means that the high peak value will be detected sooner so as to be observable, for instance in the second window e.g. within 4 seconds.

Another aspect of the subject invention is the ability to classify whether or not the vehicle is a heavy vehicle such as a tank or a bulldozer or a light passenger carrying vehicle such as a HMMWV. In one embodiment, the lighter vehicles are distinguished because their density statistic quickly reverses back to ambient. If one measures the number of time periods the peaks exceed the threshold one can distinguish heavy vehicles from light vehicles. This is because while lighter vehicles might not exceed the given threshold for the window required, as time moves on the light vehicles will be detected because their density characteristic quickly goes back to some quiescent state.

Thus, while there is not much difference per two second time frame in the output of a sensor sensing a heavy vehicle versus a light vehicle, in view of the fact that there will be a lot of peaks, spikes or impulsive energy within a given two second time frame, it is a question of for how long the peaks are sustained. For instance, a tank would have detectable peaks for a much longer period of time than a light vehicle; and one would hear a tank a lot further away than a car. Thus, one would have a much longer time period where one would see the density statistic exceeding the threshold. For lighter vehicles, the opposite is true.

In fact, after collecting a large amount of data for different vehicles it was found that there is a clear demarcation between how long it takes for a heavier vehicle type to pass and how many frames the density statistic would have to exceed the threshold versus how long it would take for a lighter car. Thus, the number of time periods in which the peaks exceed the threshold is an indication of the weight of the vehicle.

In summary, a system is provided for detecting the passage of vehicles and the classification thereof by weight using geophone outputs and a unique density measurement in which the number of peaks of the geophone signal above a predetermined threshold over a number of time frames indicates the presence of a vehicle, with the number of time frames in which the density exceeds the threshold indicating whether the vehicle is a heavy vehicle such as a tank, or a light vehicle such as a car, with the threshold eliminating both manmade and natural noise, as well as distinguishing seismic vibrations due to personnel and animals. In one embodiment, various thresholds are utilized to detect the onset of vehicle presence and the end of the event.

BRIEF DESCRIPTION

These and other features of the subject invention will be better understood in connection with the Detailed Description and in conjunction with the Drawings of which:

FIG. 1 is a plot of the received seismic signal during a vehicle pass-by;

FIG. 2 is a plot of the density statistic during a vehicle pass-by, an ambient period, and a walk-by;

FIG. 3 is a series of plots of the seismic signal and the corresponding density statistic during a car pass-by and a tank pass-by;

FIG. 8 is a series of plots of the signal received at the 6 different sensors used in (Test B-first day) during a vehicle pass-by;

FIG. 10 is a series of plots of the signal received at 4 different sensors used in (Test B-second day) during a vehicle pass-by;

Figure 11:
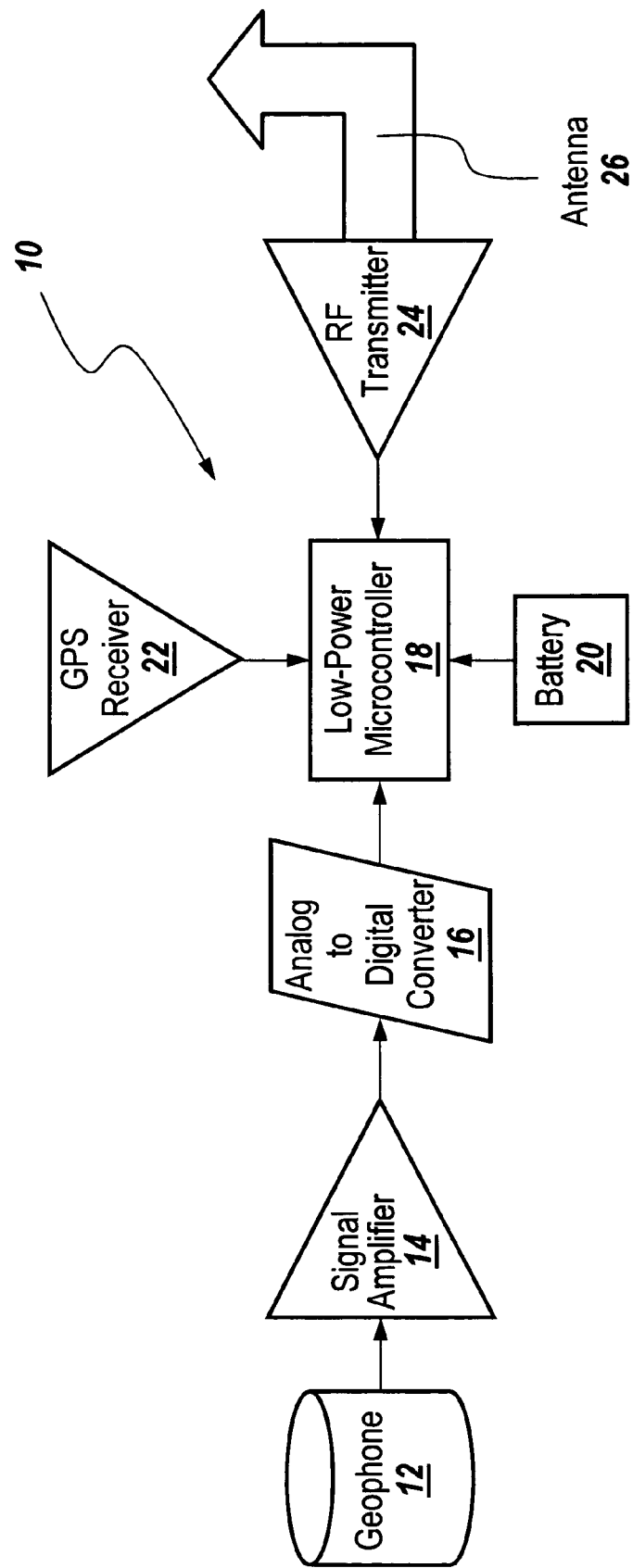
Figure 12:
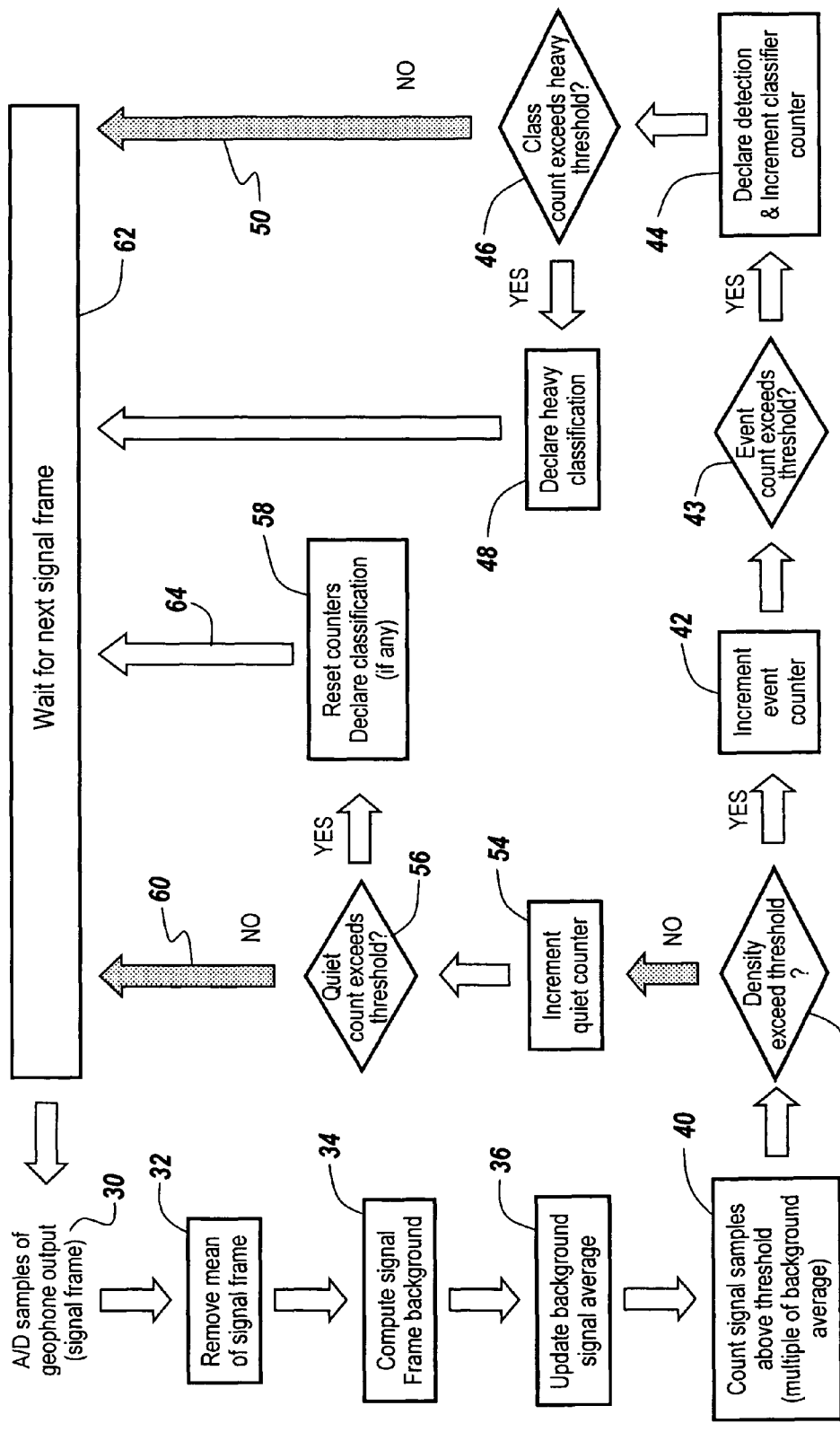

FIG. 11 is a block diagram of the subject seismic system for vehicle detection and vehicle weight classification; and, FIG. 12 is a flow chart for the system of FIG. 11 illustrating the receipt of an analog-to-digital converted sample of a geophone output within a signal frame in which background is computed, an updated signal average is obtained and signal peaks above the threshold are detected, followed by the declaration of detection and a vehicle classification determined.

DETAILED DESCRIPTION

Vehicle Detection Using a Seismic Sensor Algorithm Details

Figure 1:
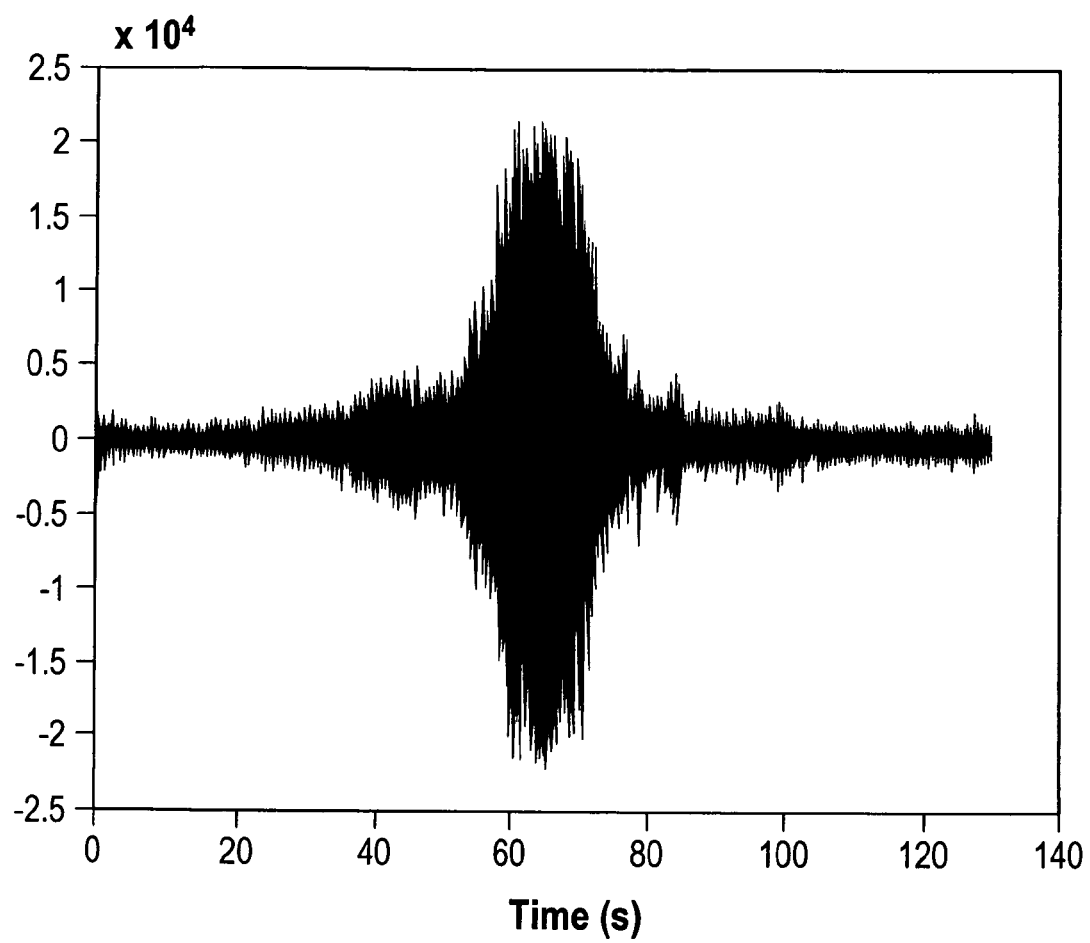
Figure 2:
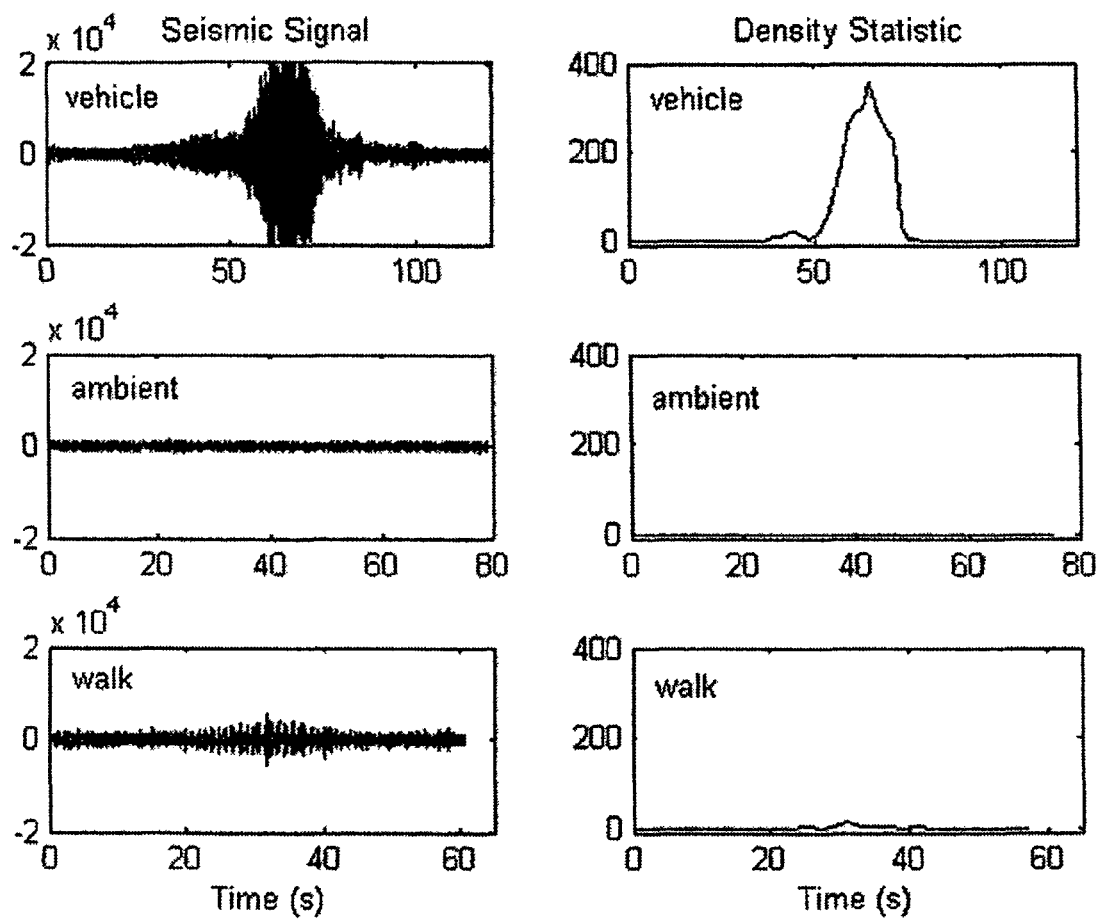

Referring now to FIG. 1, this figure shows a representative vehicle pass-by as collected using a cube seismic sensor. As shown in the figure, there is a steady and large increase in signal amplitude up until the Closest Point of Approach (CPA), at which point there is a steady decrease in the signal amplitude. If one divides the signal in time into 2 second intervals, one can compute a related statistic (heretofore called the density statistic) that reflects the number of samples in each 2 second frame that are at least a certain number of multiples above the computed background noise level. FIG. 2 illustrates the density statistic for a vehicle pass-by, an ambient period, and a personnel pass-by. As expected, the vehicle pass-by results in a sizable number of samples well above the background level, whereas the ambient and personnel data do not exhibit such large density values. This is an important observation, especially with respect to the signature of a person walking near the sensor. While the seismic signature of a walker will invariably result in a received signal with significant energy, the impulsive nature of footsteps do not result in the same type of loud, sustained amplitude signal obtained when a vehicle passes by a seismic sensor. We would similarly expect other impulsive or intermittent environmental phenomena, such as a wind or wildlife, to generate lower density values as compared with that generated by vehicles.

Figure 3:
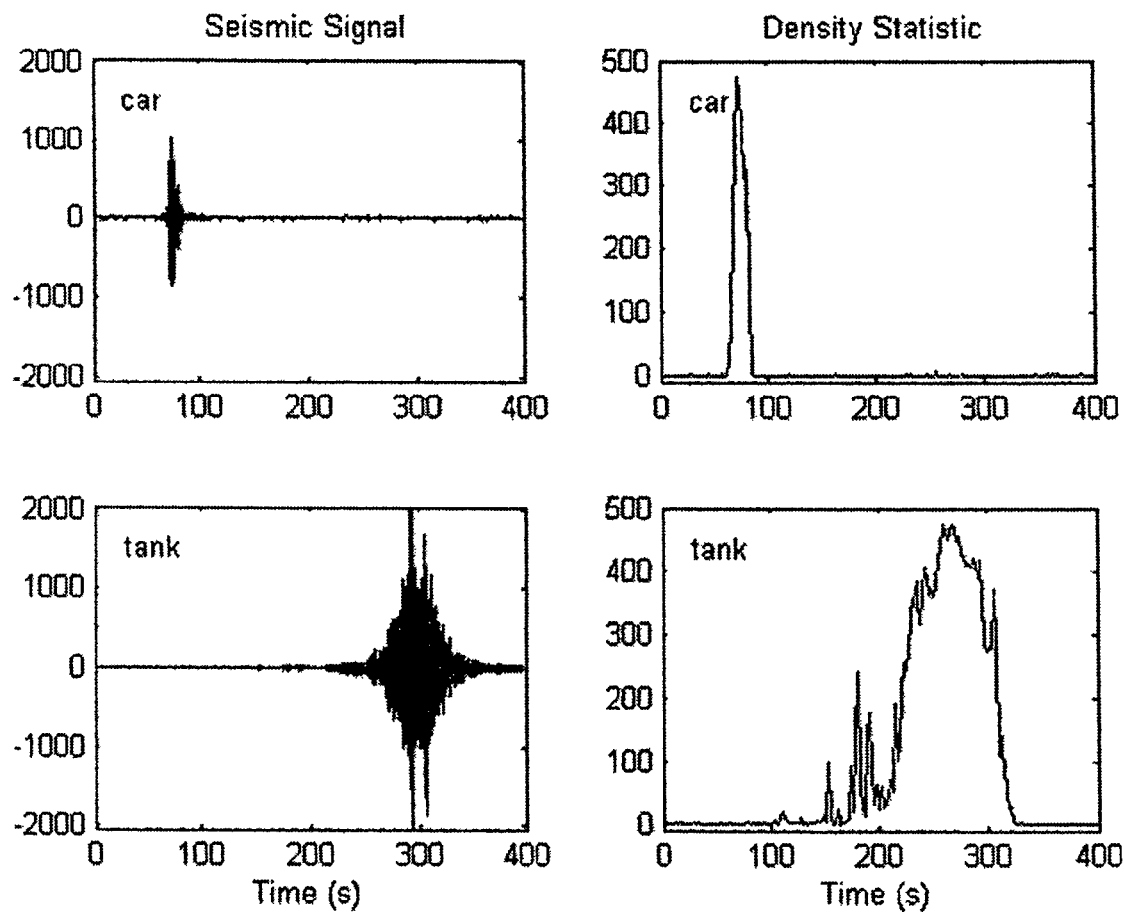

The density statistic also exhibits an ability to discern vehicles of different weight classes. FIG. 3 shows a passenger vehicle (car) pass-by and a tank pass-by, as well as their respective densities. The tank signature is visible for a much longer period of time than the passenger vehicle, which is not surprising considering the differences between the two types of vehicles. Correspondingly, the number of 2 second frames containing an elevated density statistic is much greater with the tank data than with the passenger vehicle data. Because of this, one can use the density statistic to classify vehicles.

There are a number of details that need to be considered in a real-time implementation of the described vehicle detection algorithm. While it is easy to visualize the background noise level, it is not as straightforward to compute a value for that level with an actual signal in real-time. The standard deviation is a reasonable proxy for the background noise level over a long period of time, but the computation of the standard deviation is too costly for implementation on the seismic sensor. To solve this issue, one determines the background noise level using a computed estimate of the standard deviation that is exponentially averaged over time.

With the background noise level established, a set of thresholds must be determined. While one certainly needs detection and classification thresholds, one also needs thresholds that tell us when a vehicle pass-by has concluded since there may be some ambiguity with vehicles changing speeds as they pass by the sensor. The complete set of thresholds are a density detection threshold, a lower light vehicle threshold, an upper light vehicle threshold, a lower heavy vehicle threshold, a density vehicle event threshold, and a vehicle event end threshold.

The density detection threshold defines the minimum density level in a 2 second time frame required to trigger a possible vehicle alert. Note that an alert is not reported, however, until the lower light vehicle threshold has been exceeded. Once the density level detection threshold has been exceeded, a (possible) vehicle "event" is defined. All density computations in subsequent 2 second frames are attributed to the current event until the density falls below the density vehicle event threshold for a certain number of successive frames. The threshold defining this number of "quiet" successive frames is termed the vehicle event end threshold, and at this point, the current event is considered to have ended.

Within an event, a classification counter is established that adds up the number of 2 second frames where the density has exceeded the density detection threshold. When this counter exceeds the lower light vehicle threshold, a vehicle detection alert is generated. The classification counter continues to accumulate the total number of frames where the density detection threshold has been exceeded until the vehicle event has ended. If, at the conclusion of the current vehicle event, the classification counter is less than the upper light vehicle threshold, a classification of "light vehicle" is reported. If, during the vehicle event, the classification counter exceeds the lower heavy vehicle threshold, a classification of "heavy vehicle" is reported. Note that in the case of a heavy vehicle, a classification report is generated prior to the end of the current vehicle event.

If the classification counter falls in between the upper light vehicle threshold and the lower heavy threshold at the end of a vehicle event, a report of "vehicle of unknown weight" is generated. The expected frequency of this type of report is given in the Algorithm Performance section of this document.

The following relates to tests of the subject system. What is detailed is the testing that illustrates the performance of the vehicle detection algorithm. All reported numbers are based on the post-processing of data recorded by sensors at different field tests (i.e. results were not generated from real-time performance). The algorithm was tested using data collected from 3 different sensor types. The first sensor type was a cube seismic sensor with internal (Geospace Corp) GS-14 geophone. The second sensor type was a cube seismic sensor with a tethered (Geospace Corp) GS-20 geophone. The third sensor type was a BAE Systems MIUGS sensor with a tethered GS-14 geophone. For the MIUGS sensors, the data was resampled to match the cube seismic sensor sampling rate of 256 Hz. The use of the MIUGS sensor data was necessitated by the lack of recorded military vehicle data using the cube seismic sensor.

New Hampshire Field Test Test A

Figure 4:
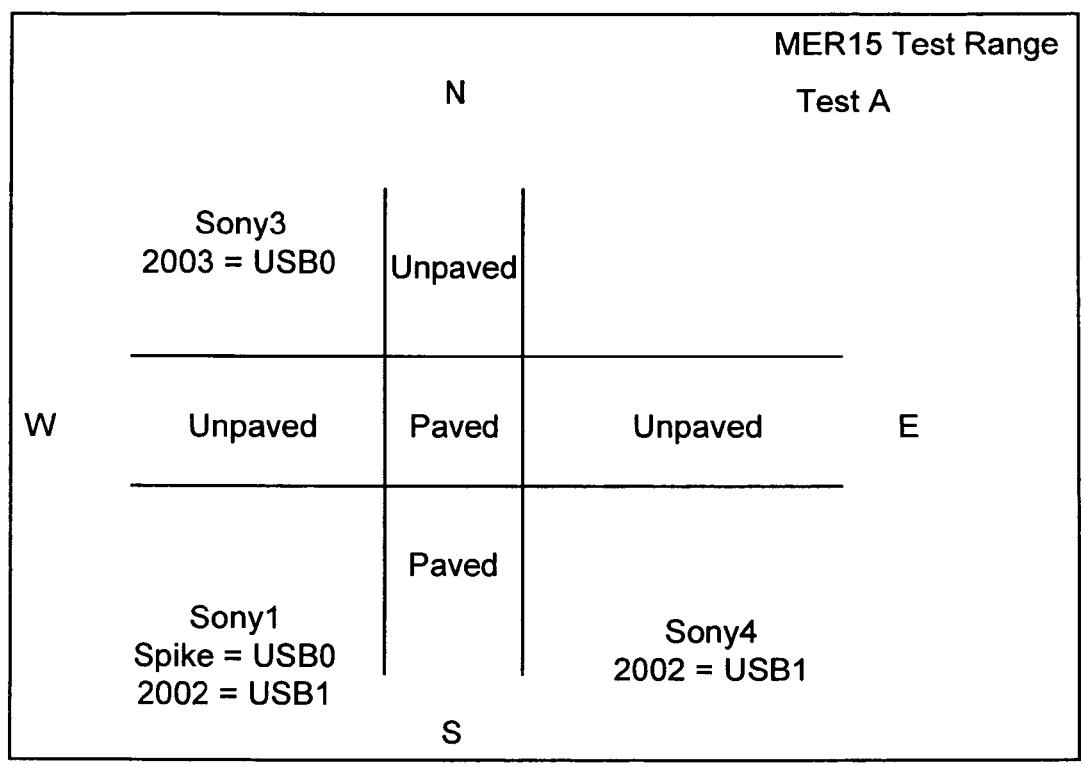
FIG. 4 is a diagrammatic illustration of a test layout for data collection on a two-day test (Test. A) of the subject system.

This field test was a two day test in Merrimack, N.H. during the daytime hours. The weather was mild for this time of year in New Hampshire. On the first day there was a high temperature of 58 degrees and an average wind speed of 6 mph, with gusts as high as 33 mph. On the second day it was a bit less windy, with a similarly high temperature of 58 degrees and an average wind speed of 3 mph, with gusts as high as 20 mph. The seismic sensors were set up around the central intersection on the range as shown in FIG. 4.

Sensors 2001, 2002, 2003 contained internal GS-14 geophones, while Sensor 2010 (labeled "Spike") had a tethered GS-20 geophone attached to it.

The field test consisted of vehicle and personnel pass-bys on the two roads, as well as ambient periods collected throughout the day. The vehicles included in this data collection were a Toyota Corolla, a Ford F-150 pickup truck, an empty 2.5 Ton military truck, as well as a few different unscripted SUVs. The data was recorded on co-located Linux-based Sony PCs running a custom data logging application, and automatically backed up every 10 minutes via an 802.11b wireless network to a remote Linux-based PC stationed approximately 200 ft south of "Sony1".

Test B

Figure 5:
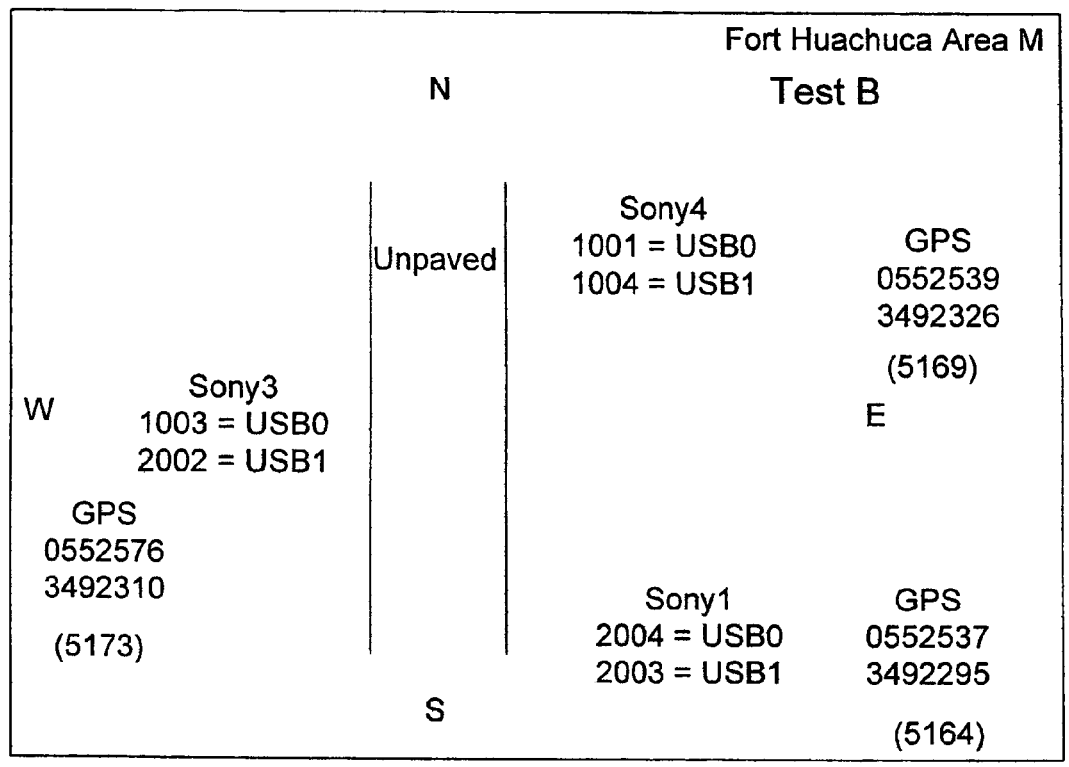
FIG. 5 is a diagrammatic illustration of a test layout for data collection on a test (Test B-first day) in which sensors are placed approximately 10 m from the road and in which elevation is given in parentheses.

A second field test was a two day test conducted at Area M in Fort Huachuca, Ariz. during the daytime hours. The weather was normal for Fort Huachuca at this time of year. On the first day, temperatures ranged from 55 to 68 degrees during the test, with 4 mph winds and gusts up to 12 mph. On the second day, temperatures were in a similar range, with 4 mph winds and gusts up to 8 mph. The seismic sensors were set up 3 different locations during the field test. The first location was alongside a dirt road; and is depicted in FIG. 5.

The test configuration consisted of cube seismic sensors with internal GS-14 geophones (cube 2010 was not functional during this part of the field test). Testing at this location consisted of various passenger vehicle and personnel pass-bys on the dirt road, as well as ambient periods collected throughout the day. The vehicles included in this data collection were a Jeep Wrangler, a small Nissan pickup truck, an ATV, and a dirt bike. The data was recorded on co-located Linux-based Sony PCs running a custom data logging application, and automatically backed up every 10 minutes via an 802.11b wireless network to a remote Linux-based PC stationed approximately 100 ft south of "Sony1".

Figure 6:
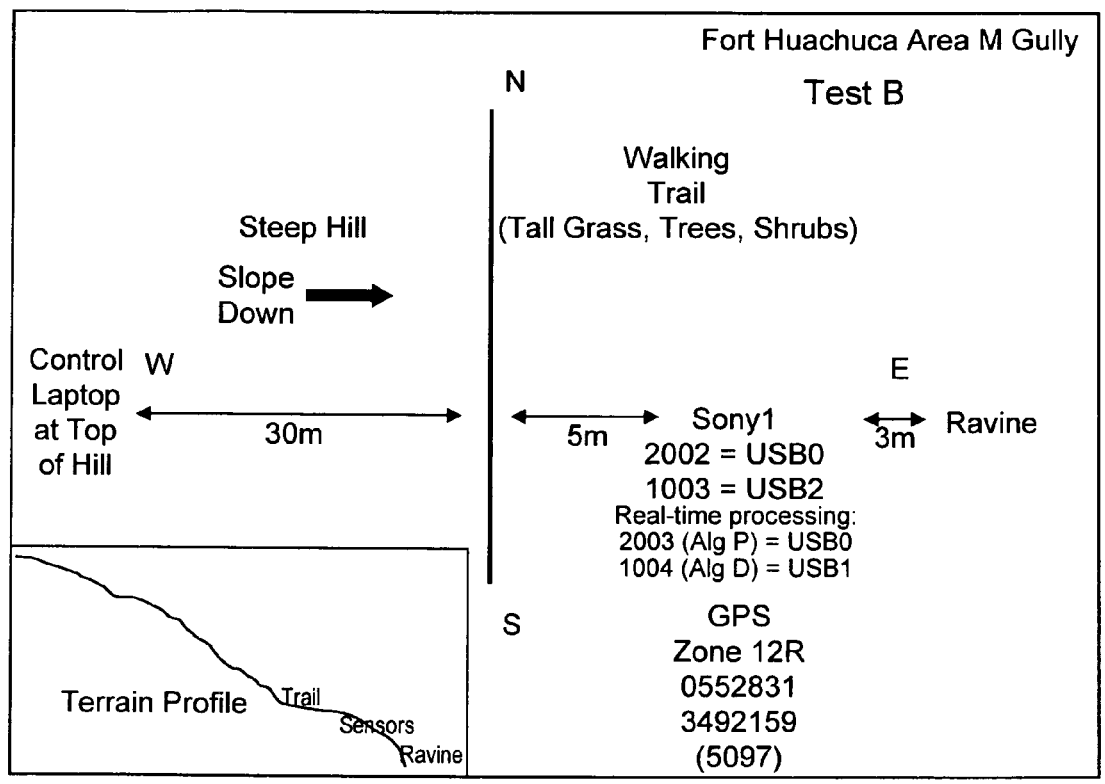
FIG. 6 is a diagrammatic illustration of the test layout for personnel data collection on a test (Test B-second day) in which sensors were placed approximately 5 m east of the walking path with the elevation is given in parentheses.

The second location at Fort Huachuca was in a gully located approximately 0.7 km east of the dirt road and was not generally accessible by vehicle. As such, only personnel pass-bys and ambient periods were collected. The test layout for this location is shown in FIG. 6.

The test configuration consisted of 2 cube seismic sensors with internal GS-14 geophones, as well as 2 "real-time" processing cube sensors running different versions of a personnel algorithm.

Figure 7:
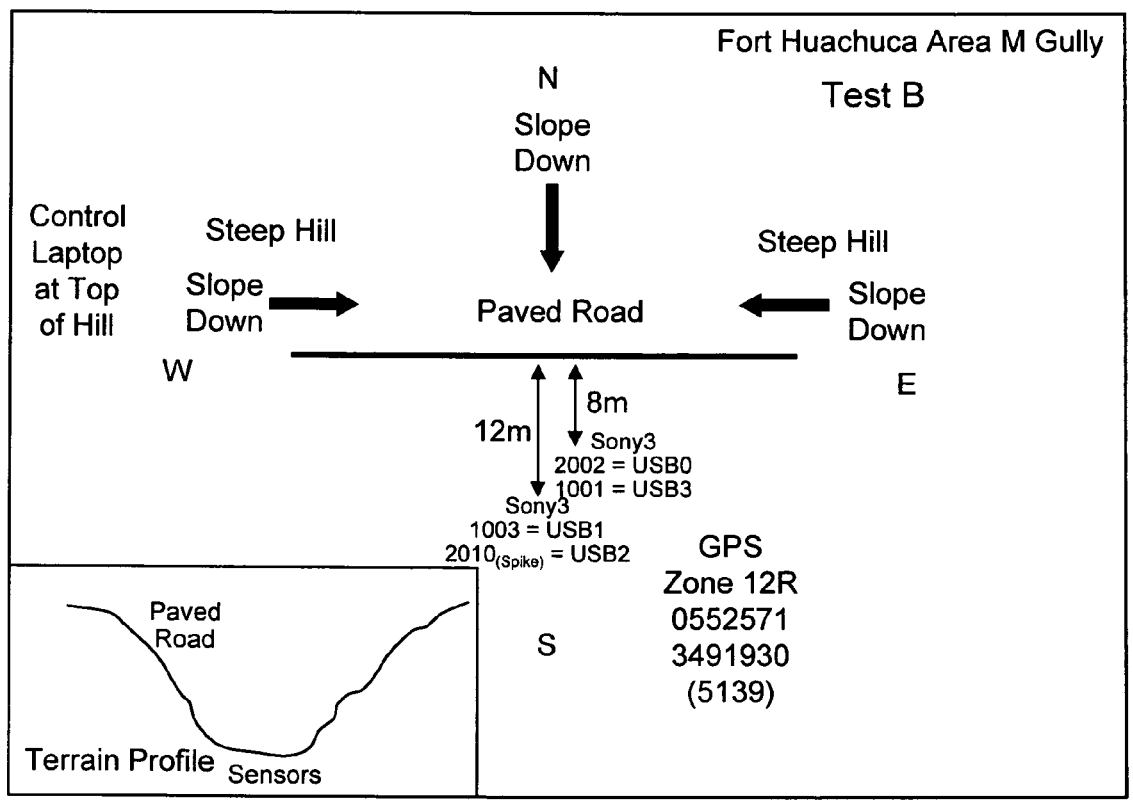
FIG. 7 is a diagrammatic illustration of the test layout for paved road vehicle data collected on the second day of Test B in which sensors approximately 8-12 m were placed south of the road, with the elevation given in parentheses.

The third location at Fort Huachuca was located alongside a paved road about 300 m SSE of the first location. Because of the prevalence of unscripted vehicles on this road, no personnel pass-bys were performed at this location. The test layout for this location is shown in FIG. 7.

The test configuration consisted of 3 cube seismic sensors with internal GS-14 geophones and 1 cube seismic sensor (2010) with a tethered GS-20 geophone. The vehicles included in this data collection were a Jeep Wrangler, a small Nissan pickup truck, as well as several unscripted passenger vehicles.

The MIUGS data used in algorithm development and validation was collected earlier at Eglin AFB during the nighttime hours. This data collection included a variety of vehicle and personnel pass-bys. The test included more than 10 different military vehicles (e.g. tanks, personnel carriers, missile launchers) and 10 different passenger vehicles. Data was collected on sensors using tethered GS-14 geophones. Sensors were located either 30 m or 75 m from the road, depending on the particular test configuration.

New Hampshire Test Results Test A

Table 1 lists the probability of detection (pD) and the probability of false alarm (pFA) for each sensor (first day). As seen in the table, the vehicle detection algorithm combines a high probability of detection with a low false alarm rate.

TABLE 1

Detection performance (first day). Results based on 44 vehicle pass-bys, 47 ambient periods, and 4 personnel pass-bys.

| Sensor | pD | pFA |
|---|---|---|
| 2010 (GS-20) | 93.2% | 0% |
| 2002 | 97.7 | 0 |
| 2003 | 97.7 | 5.8 |
| 2001 | 97.7 | 0 |

Table 2 2 shows the classification confusion matrix. The algorithm demonstrates consistently good performance on the three types of data collected.

TABLE 2

Classification confusion matrix (first day). Results based on 44 vehicle pass-bys, 47 ambient periods, and 4 personnel pass-bys. Data was aggregated from all 4 sensors.

| | Report | | | | |
|---|---|---|---|---|---|
| Truth | Light | Heavy | Unknown Vehicle | No Report | % Correct |
| Light | 169 | 0 | 0 | 7 | 96.0% |
| Heavy | 0 | 0 | 0 | 0 | — |
| Person | 1 | 0 | 0 | 15 | 93.8 |
| Ambient | 2 | 0 | 0 | 186 | 98.9 |

Table 3 shows the probability of detection (pD) and the probability of false alarm (pFA) for each sensor on the second day of Test A. Again, the vehicle detection algorithm combines a high probability of detection with a low false alarm rate.

TABLE 3

Detection performance (second day). Results based on 44 vehicle pass-bys, 46 ambient periods, and 4 personnel pass-bys.

| Sensor | pD | pFA |
|---|---|---|
| 2010 (GS-20) | 93.5% | 0% |
| 2002 | 97.8 | 0 |
| 2003 | 97.8 | 0 |
| 2001 | 95.7 | 0 | shows the classification confusion matrix (Test A-second day). The algorithm demonstrates consistently good performance on the three types of data collected, although slightly more vehicles were classified as "Unknown" during this day of testing. When a light vehicle is misreported, it is reported as "Unknown" rather than "Heavy".

TABLE 4

Classification confusion matrix (second day). Results based on 44 vehicle pass-bys, 46 ambient periods, and 4 personnel pass-bys. Data was aggregated from all 4 sensors.

| | Report | | | | |
|---|---|---|---|---|---|
| Truth | Light | Heavy | Unknown Vehicle | No Report | % Correct |
| Light | 171 | 0 | 5 | 8 | 92.9% |
| Heavy | 0 | 0 | 0 | 0 | — |
| Person | 0 | 0 | 0 | 16 | 100 |
| Ambient | 0 | 0 | 0 | 184 | 100 |

Fort Huachuca Test Results Test B

Figure 8:
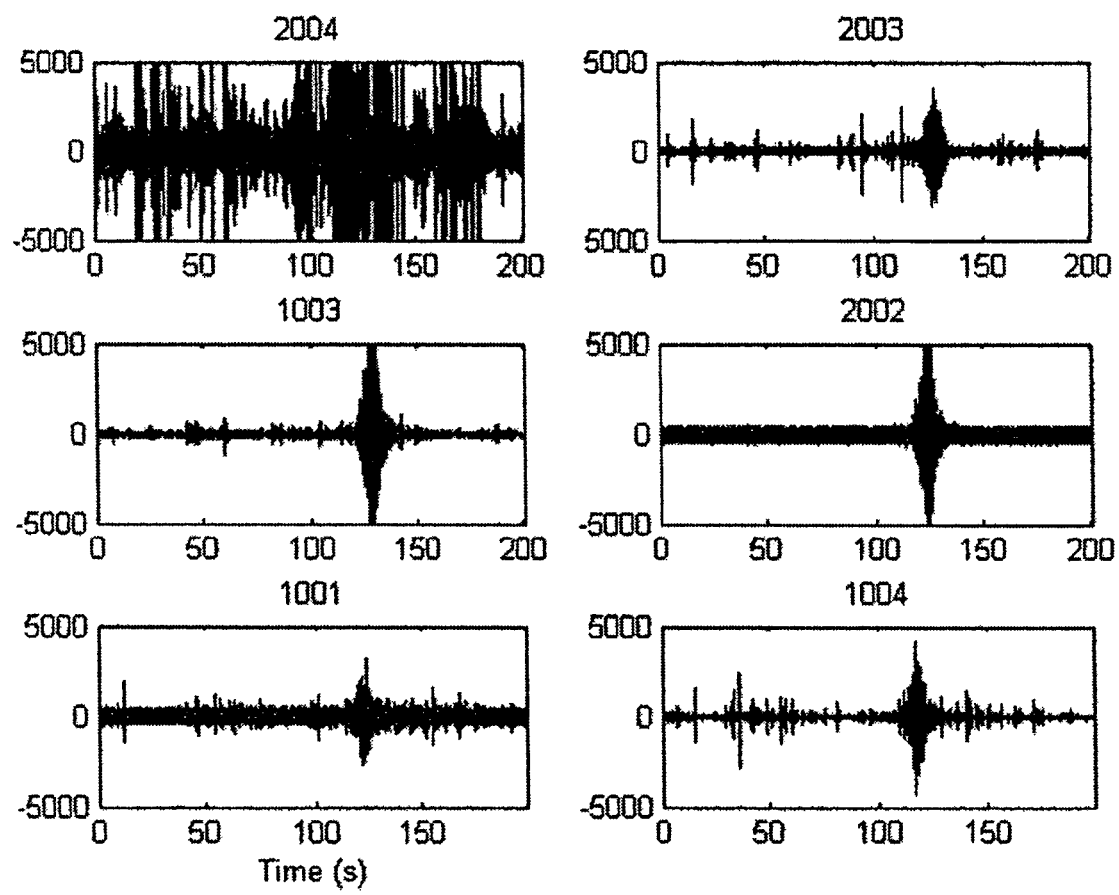
Figure 9:
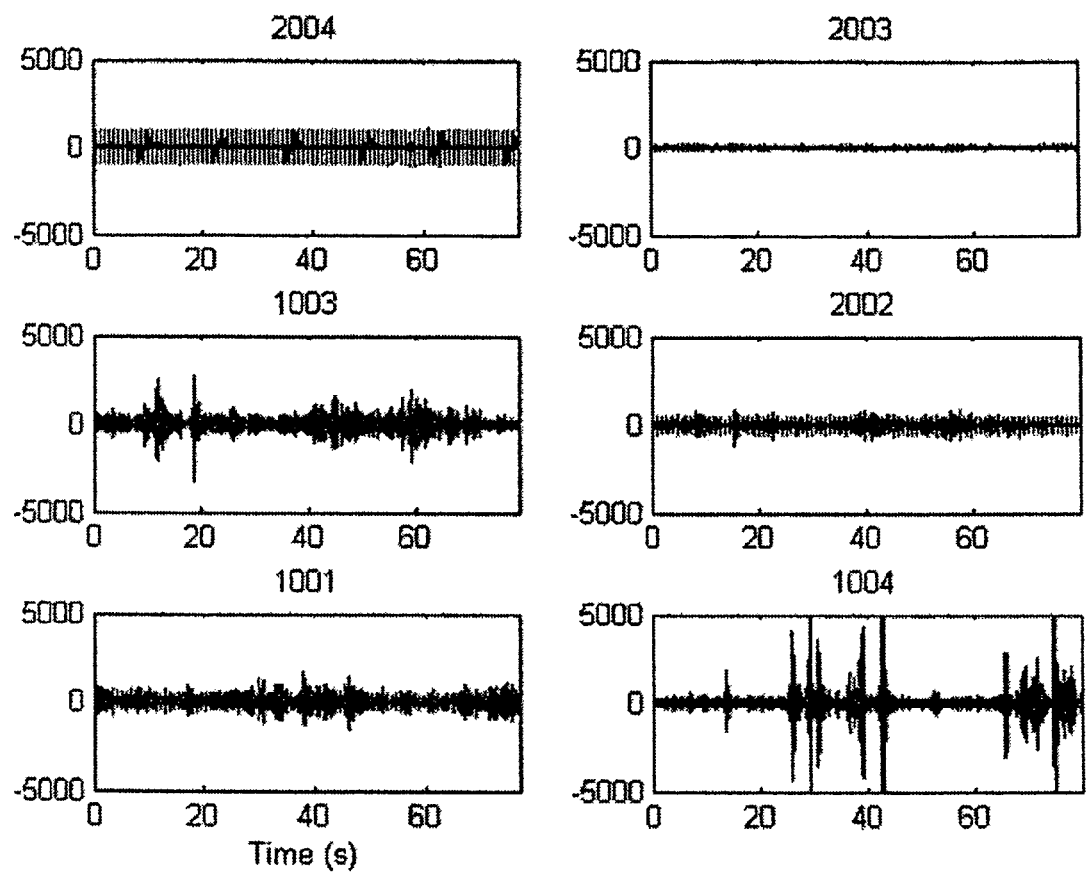
FIG. 9 is a series of plots of the signal received at 6 different sensors (Test B-first day) test during an ambient period.

Table 5 lists the probability of detection (pD) and the probability of false alarm (pFA) for each sensor on the first day of the test. While, at first glance, the results may seem mixed, it turns out that the poorly behaving sensors appear to be malfunctioning, resulting in poor seismic signal quality. FIG. 8 shows a plot of a vehicle pass-by as received at the 6 different sensors. Sensor 2004 is clearly not properly receiving the seismic signal present during that time period. Sensor 1001 is exhibiting a reduced sensitivity, especially when compared to sensors 1003 and 2002. This explains its lower probability of detection. The rationale behind the poor performance of Sensor 1004 is a bit more subtle. FIG. 9 shows a plot of an ambient period as received at the 6 sensors on the first day of Test B. During the ambient period, Sensor 1004 is picking up noticeably more noise than any other sensor. In particular, notice that Sensor 1001, which is co-located with Sensor 1004, does not receive the high energy interference that Sensor 1004 is exhibiting. (Despite the reduced gain of Sensor 1004, we would still expect the largest amplitudes to occur simultaneously on both sensors.) Also, notice that most of the sensors exhibit periodic spikes occurring every 0.8 seconds, presumably due to RF interference. Limiting our focus to Sensors 2003, 1003, and 2002, we see a high probability of detection with a low false alarm rate.

TABLE 5

Detection performance (first day). Results based on 30 vehicle pass-bys, 34 ambient periods, and 6 personnel pass-bys.

| Sensor | pD | pFA |
|---|---|---|
| 2003 | 100 | 5.6 |
| 1003 | 96.8 | 2.8 |
| 2002 | 100 | 0 |

Table 6 shows the classification confusion matrix (first day). The algorithm demonstrates consistently good performance on the three types of data collected.

TABLE 6

Classification confusion matrix (first day). Results based on
30 vehicle pass-bys, 34 ambient periods, and 6 personnel pass-bys.
Data was aggregated from Sensors 2003, 1003, and 2002.

| | Report | | | | |
|---|---|---|---|---|---|
| Truth | Light | Heavy | Unknown Vehicle | No Report | % Correct |
| Light | 92 | 0 | 0 | 1 | 98.9% |
| Heavy | 0 | 0 | 0 | 0 | — |
| Person | 0 | 0 | 0 | 18 | 100.0 |
| Ambient | 3 | 0 | 0 | 105 | 97.1 |

Table 7 lists the probability of false alarm (pFA) for each sensor on the second day at the gully site. Since there were no vehicle pass-bys, the only type of reports generated by the vehicle detection algorithm would be false alarms. A total of one false alarm was witnessed during testing at this particular location.

TABLE 7

Detection performance (second day) at the gully site. Results
based on 2 ambient periods and 22 personnel pass-bys.

| Sensor | pFA |
|---|---|
| 2002 | 0% |
| 1003 | 4.5 |

Figure 10:
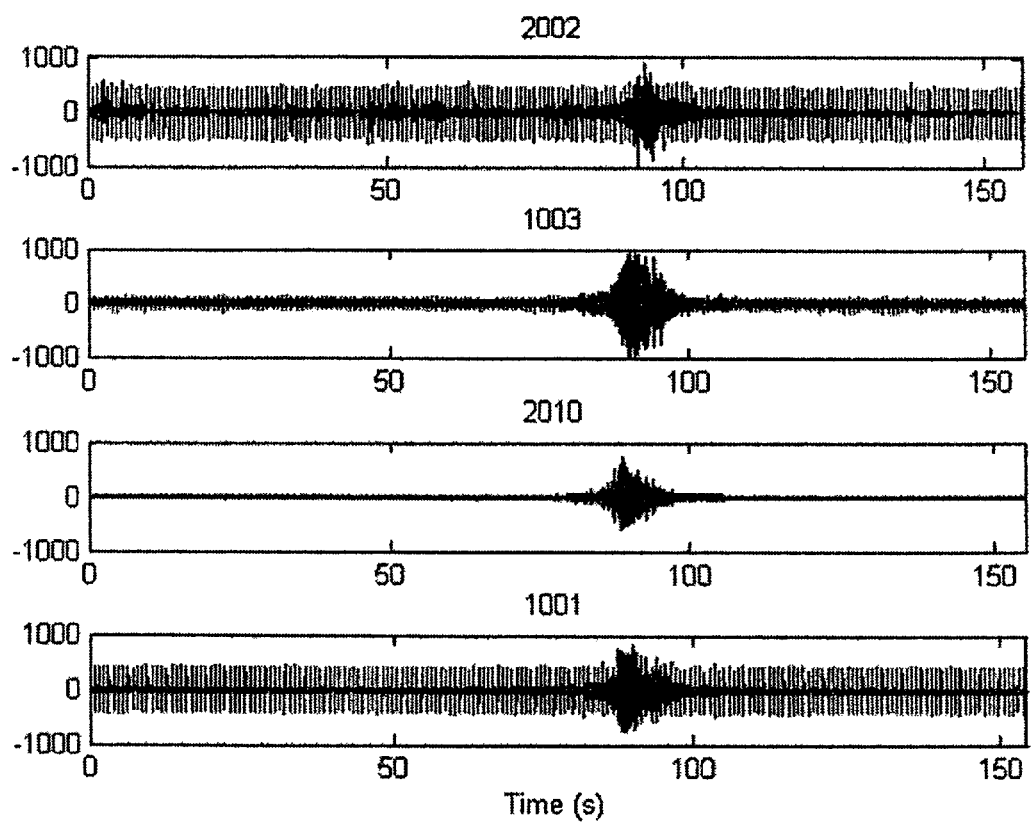

Table 8 lists the probability of detection (pD) and the probability of false alarm (pFA) for each sensor on the second day at the paved road site. The results again show some inconsistency with respect to probability of detection. However, a study of the signal quality again reveals issues with the lesser performing sensors. FIG. 10 shows the signals received by the sensors during a vehicle pass-by (Test B-second day). As seen in the figure, Sensors 2002 and 1001 both exhibit significant RF interference, such that the amplitudes of the RF spikes are larger than the seismic signature of the vehicle. This reduces the density statistic by artificially increasing the measured background noise level, which will lead to decreased detection performance. Sensors 1003 and 2010, both with reasonable signal quality, demonstrate excellent detection performance at this test location.

TABLE 8

Detection performance (second day) at the paved road site.
Results based on 16 vehicle pass-bys and 12 ambient periods.

| Sensor | pD | pFA |
|---|---|---|
| 1003 | 100 | 0 |
| 2010 (GS-20) | 100 | 0 |

Table 9 shows the classification confusion matrix for the second day at the paved road site. The algorithm demonstrates consistently good performance on the two types of data collected.

TABLE 9

Classification confusion matrix (second day) at the paved road site.
Results based on 16 vehicle pass-bys and 12 ambient periods.
Data was aggregated from Sensors 1003 and 2010.

| | Report | | | | |
|---|---|---|---|---|---|
| Truth | Light | Heavy | Unknown Vehicle | No Report | % Correct |
| Light | 32 | 0 | 0 | 0 | 100% |
| Heavy | 0 | 0 | 0 | 0 | — |
| Ambient | 0 | 0 | 0 | 24 | 100 |

MIUGS Test Results

The focus here is on classification performance, as the detection performance has already been well documented through testing on the cube seismic sensor hardware. Table 10 shows the confusion matrix for the MIUGS data. If the unknown category is included in the percent correct tabulation, the algorithm scores well with light vehicles and fair with heavy vehicles. However, a declaration of "Unknown" could also be considered an ambiguous answer, rather than an incorrect answer. With this viewpoint (that the algorithm has to get the classification category wrong to have a decision counted against it), the performance on light vehicles is excellent and the performance on heavy vehicles is satisfactory.

TABLE 10

Classification confusion matrix for MIUGS data collected at
Eglin AFB. Results based on 840 vehicle/sensor pass-bys,
of which 553 were light vehicles and 287 were heavy vehicles.

| | Report | | | | |
|---|---|---|---|---|---|
| Truth | Light | Heavy | Unknown Vehicle | % Correct (Including Unknown) | % Correct (Excluding Unknown) |
| Light | 512 | 6 | 35 | 92.6% | 98.8% |
| Heavy | 45 | 193 | 49 | 67.2% | 81.1% |

The data presented demonstrates the utility of a vehicle detection algorithm derived from the density statistic. The algorithm exhibited a high probability of detection combined with a low false alarm rate on variety of data sets, collected on 3 different sensor types. Furthermore, this performance was established at locations with differing geological properties, proving that the approach is sufficiently general. The above also establishes the use of the density statistic to classify weight classes of different types of vehicles. Using the MIUGS data, the system was able to distinguish between heavy military vehicles such as tanks and lighter commercial vehicles like cars. Given the diversity of data and sensor types used in development and testing, the subject vehicle detection/classification approach is well-suited for a seismic unattended ground sensor system.

Referring now to FIG. 11, the subject system 10 for detecting vehicle passage and vehicle weight includes a geophone 12 coupled to a signal amplifier 14, in turn coupled to an analog-to-digital converter 16 which is coupled to a low power microcontroller 18. The microcontroller is powered by a battery 20 and a GPS receiver 22 has its geo-location output coupled to the microcontroller to be able to pinpoint the location of the geophone.

The output of the low power microcontroller is coupled to an RF transmitter 24 which transmits the information from the microcontroller out to an antenna 26.

As stated above, it is the purpose of the microcontroller to process the output of a geophone so as to first determine a background threshold and then to determine both the existence of a vehicle passing by and its weight.

As mentioned above, the geophone does not consume any battery power, whereas the microcontroller is operated in a low power regime in which all calculations are done without use of floating point operations.

The system described in FIG. 11 is thus one which is exceedingly low power consumptive and can with the subject algorithm provide a robust indication of the passage of a vehicle through seismic signatures as well as to provide a gross weight classification as to whether the vehicle is a heavy vehicle such as a tank, or a light vehicle such as a car.

As described above the system is able to distinguish footsteps, and both naturally occurring and manmade seismic sources. Vehicle detection is accomplished through the utilization of a unique characteristic of the geophone output to vehicle vibrations, namely a count of the number of seismic peaks above a threshold in one or more timeframes. In one embodiment the threshold is adaptive, with the threshold eliminating naturally produced and manmade noise that is not associated with a vehicle.

Additionally, the sampling of the geophone is done in time frames and the number of peaks existing above the threshold not only indicates the presence of a vehicle pass-by but also the weight of the vehicle by keeping track of the timeframes in which the threshold is exceeded. Thus, the number of counts in a number of successive time frames indicates not only the presence of a vehicle but also its weight as described above.

Referring now to FIG. 12, what is shown is a flow chart for the seismic method for detection and vehicle weight classification. As illustrated at 30, a number of analog-to-digital samples of the geophone output with a signal frame are collected, with the mean of the signal frame removed at 32. With the mean removed, the signal frame background is computed at 34 and with the background computed the background signal average is updated at 36.

As illustrated at 40, the density statistic includes a count signal developed for counting the samples above the background threshold which in one embodiment is a multiple of the background average. If the count exceeds the threshold 41, this indicates the presence of a vehicle, and an event counter 42 is incremented. With the incrementing of event counter 42. When the event counter exceeds a preset threshold 43 the detection of a vehicle is declared as shown at 44; and the classifier counter is incremented.

As illustrated at 46, when the class count exceeds a threshold indicating the presence of a heavy vehicle as illustrated at 48, the presence of a heavy vehicle is declared. If the class count does not exceed the heavy vehicle threshold then there is an indication of a light vehicle or the inability to detect what kind of vehicle exists, here illustrated by arrow 50.

If the count signal samples above the threshold are fewer than those that indicate the presence of a vehicle, then a quiet counter 54 is incremented. If the quiet count exceeds a threshold as illustrated at 56 then the counters are reset and a classification is declared if any is possible as shown at 58.

If the quiet count does not exceed a predetermined threshold as illustrated at 56, the system waits for the next signal frames as illustrated at 62. Likewise, if the counters are reset as illustrated by a signal on arrow 64, then the system again waits for another signal frame.

The calculation and definition of the thresholds utilized have been described hereinbefore with it being noted that the quiescent background threshold is different than the quiet count threshold.

The following is a program listing for the system illustrated in FIGS. 11 and 12:

```
include <stdio.h> include <stdlib.h> define FS 256 define TWO_SEC_SAMPLES 2*FS define TWO_SEC_EXPONENT 9
``` vehicle_density define EVENT_THRESHOLD 5 define EVENT_END 2 define DETECT_THRESHOLD 100 define HEAVY_THRESHOLD 21 define MEDIUM_THRESHOLD 12 define LIGHT_THRESHOLD 0 define HEAVY_VEHICLE 1 define MEDIUM_VEHICLE 2 define LIGHT_VEHICLE 3 define NON_VEHICLE 5 int read_two_seconds(FILE *fid,unsigned int *buffer);

int read_two_sec_binary(FILE *fid,unsigned int *buffer);

unsigned int two_sec_mean(unsigned int *buffer);

unsigned int two_sec_abs_mean(int *buffer);

void demean_frame(unsigned int *two_sec_frame,int *demeaned_frame);

void initialize(unsigned int *event_flag,unsigned int *quiet_cnt,unsigned int *classification_cnt,unsigned int *detection_flag,unsigned int *send_detect_report,unsigned int *classification_flag,unsigned int *send_class_report);

unsigned int compute_density(unsigned int *two_sec_frame);

unsigned int get_classification_type(int classification_cnt);

void vehicle_decision(unsigned int density_cnt,unsigned int *event_flag,unsigned int *quiet_cnt,unsigned int *classification_cnt, unsigned int *detection_flag,unsigned int *send_detect_report,unsigned int *classification_flag,unsigned int *send_class_report);

void initialize(unsigned int *event_flag,unsigned int *quiet_cnt,unsigned int *detection_flag,unsigned int *send_detect_report,unsigned int *classification_flag,unsigned int *send_class_report);

unsigned int first_call = 1;

long long_term_std = 0;

```
int read_two_seconds(FILE *fid,unsigned int *buffer)
{
    int i;
    int sample;

for (i=0;i<TWO_SEC_SAMPLES;i++)
    {
        if (fscanf(fid,"%d",&sample) != EOF)
        {
            buffer[i] = (unsigned int)sample;
        }
        else
        {
            return(0);
```

```
                }
            }
            return(1);
} unsigned int two_sec_mean(unsigned int *buffer)
{
  int i;
  unsigned long average;

average = 0;
  for (i=0;i<TWO_SEC_SAMPLES;i++)
  {
        average += (unsigned long)(buffer[i]);
  }
  average >>= TWO_SEC_EXPONENT;
  return((unsigned int)average);
} unsigned int two_sec_abs_mean(int *buffer)
{
  int i;
  unsigned long average;
```

```
average=0;

for (i=0;i<TWO_SEC_SAMPLES;i++)

{ average+=abs(buffer[i]);

}

// printf("average = %d\n",average);

average >>= TWO_SEC_EXPONENT;

return((unsigned int)average);

} void demean_frame(unsigned int *two_sec_frame,int *demeaned_frame)

{ int i,mean_frame;

// compute DC offset of frame mean_frame = two_sec_mean(two_sec_frame);

//      printf("mean_frame = %d\n",mean_frame);

for (i=0;i<TWO_SEC_SAMPLES;i++)

{ demeaned_frame[i] = (int)two_sec_frame[i] - mean_frame;

}

}
```

```c
void initialize_std(unsigned int abs_mean_frame)
{
        long_term_std = (abs_mean_frame << 1);
} unsigned int compute_density(unsigned int *two_sec_frame)
{
        int i;

long tmp;

int demeaned_frame[TWO_SEC_SAMPLES];

unsigned int abs_mean_frame,density_cnt;

// remove DC offset from frame demean_frame(two_sec_frame,demeaned_frame);

// compute abs_mean for running std deviation abs_mean_frame = two_sec_abs_mean(demeaned_frame);
//      printf("abs_mean_frame = %d\n",abs_mean_frame);
        // check for initialization of long term std if (first_call)
        {
                initialize_std(abs_mean_frame);

first_call = 0;
        }
```

```
// compute exponentially averaged std deviation
// est_std = 1/128*(2*abs_mean_frame) + 127/128*est_std
// first multiply long_term_std by 127 using 7 adds and 1 subtract
tmp = long_term_std;
for (i=0;i<7;i++)
{
    tmp += tmp;
}
long_term_std = tmp - long_term_std;
// then estimate the new long_term_std
long_term_std = ((((long)abs_mean_frame << 1) + long_term_std) >> 7);

// compute density by counting the number of samples exceeding 4*long term std
density_cnt = 0;
for (i=0;i<TWO_SEC_SAMPLES;i++)
{
    if (abs(demeaned_frame[i]) >= (long_term_std << 2)) // 4*long term std
    {
        density_cnt++;
    }
}
return(density_cnt);

}
```

```
unsigned int get_classification_type(unsigned int *classification_cnt)
{
    unsigned int classification_type;

if (*classification_cnt >= HEAVY_THRESHOLD)
    {
        classification_type = HEAVY_VEHICLE;
    }
    else if(*classification_cnt >= MEDIUM_THRESHOLD && *classification_cnt < HEAVY_THRESHOLD)
    {
        classification_type = MEDIUM_VEHICLE;
    }
    else if(*classification_cnt >= LIGHT_THRESHOLD && *classification_cnt < MEDIUM_THRESHOLD)
    {
        classification_type = LIGHT_VEHICLE;
    }
    else
    {
        classification_type = NON_VEHICLE;
    }
```

```
        return(classification_type);
} void vehicle_decision(unsigned int density_cnt,unsigned int *event_flag,unsigned int
*quiet_cnt,unsigned int *classification_cnt,
                        unsigned int *detection_flag,unsigned int
*send_detect_report,unsigned int *classification_flag,unsigned int *send_class_report)
{
    unsigned int classification_type;

if (density_cnt > EVENT_THRESHOLD)
    {
        *event_flag = 1;
        *quiet_cnt = 0;
    }
    else
    {
        (*quiet_cnt)++;
    }
    // check for end of event (has no effect if event_flag is already 0)
    if (*quiet_cnt > EVENT_END)
    {
        *event_flag = 0;
```

```
        if (*classification_cnt > 0)
        {
                classification_type = get_classification_type(classification_cnt);

*classification_cnt = 0;

if (*classification_flag == 0)
                {
                        *send_class_report = classification_type;
                }
        }

*detection_flag = 0;

*classification_flag = 0;

}
// check if vehicle is present
if (*event_flag == 1)
{
        if (density_cnt > DETECT_THRESHOLD)
        {
                (*classification_cnt)++;

if (*detection_flag == 0)
                {
                        *detection_flag = 1;

*send_detect_report = 1;
```

```
        }
        // check if vehicle is HEAVY
        if (*classification_cnt >= HEAVY_THRESHOLD)
        {
            *classification_flag = 1;
            *send_class_report = HEAVY_VEHICLE;
        }
      }
    }
  }
}
```

```
void initialize(unsigned int *event_flag,unsigned int *quiet_cnt,unsigned int *classification_cnt,unsigned int *detection_flag,unsigned int *send_detect_report,unsigned int *classification_flag,unsigned int *send_class_report)
{
    // initialize event flags
    *event_flag = 0;
    *quiet_cnt = 0;
    // initialize detection and classification flags
    *classification_cnt = 0;
    *detection_flag = 0;
    *classification_flag = 0;
```

```
        *send_detect_report = 0;

*send_class_report = 0;
}
int main(int argc, char **argv)
{
        unsigned                                                                int
event_flag,quiet_cnt,classification_cnt,detection_flag,send_detect_report,classification_fl
ag,send_class_report;
        unsigned int two_sec_frame[TWO_SEC_SAMPLES];
        unsigned int density_cnt;
        unsigned int frame_cnt = 1;
        int file_not_empty;

FILE *infid;

if (argc > 1)
        {
                infid=fopen(argv[1],"r");
        }
        else
        {
                printf("\nUsage: vehicle_density.exe <inputfile>\n");
                exit(-1);
```

}

// initialize all flags initialize(&event_flag,&quiet_cnt,&classification_cnt,&detection_flag,&send_detect_report,&classification_flag,&send_class_report);

// load frame of data file_not_empty = read_two_seconds(infid,two_sec_frame);

while(file_not_empty)

{

//     printf("Frame %d\n",frame_cnt);

// compute density of frame density_cnt = compute_density(two_sec_frame);

//     printf("density_cnt = %d\n",density_cnt);

// make detection/classification decision vehicle_decision(density_cnt,&event_flag,&quiet_cnt,&classification_cnt,&detection_flag,&send_detect_report,&classification_flag,&send_class_report);

//printf("Frame %d: density_cnt = %d, event_flag = %d, quiet_cnt = %d, classification_cnt = %d, detection_flag = %d, send_detect_report = %d, classification_flag = %d, send_class_report = %d\n",frame_cnt,density_cnt,event_flag,quiet_cnt,classification_cnt,detection_flag,send_detect_report,classification_flag,send_class_report);

// report if detection and/or classification was made if (send_detect_report == 1)

```
        {
                printf("Vehicle detected at frame %d\n",frame_cnt);
                send_detect_report = 0;
        }
        if (send_class_report > 0)
        {
                printf("Vehicle classified at frame %d as type %d\n",frame_cnt,send_class_report);
                send_class_report = 0;
        }
        frame_cnt++;
        file_not_empty = read_two_seconds(infid,two_sec_frame);
}
        return(0);
```

What is claimed is:

1. A method for detecting the passage of vehicles, comprising the steps of:
locating a geophone on the ground at a known location and,
processing the signals from the geophone to derive a density statistic number corresponding to the number of regular non-intermittent peaks of the geophone signal above a threshold set above a measured background level, whereby the number of non-intermittent peaks above the threshold indicate the presence of a vehicle, the background level being set using a standard deviation technique as a background level surrogate, the background level being set without computing square roots, the background level being set using $$s\_estimate = 2 * \frac{1}{512} \sum_{i=1}^{512} |x_i|,$$

where $x_i$ is the sample of the geophone signal x at time $i$ to estimate the standard deviation, and s_estimate is the estimate of the standard deviation.

2. The method of claim 1, wherein the number of peaks of the geophone signal above the threshold is taken over a number of time frames and define an envelope, and further including the steps of determining how many time frames peaks exist above the threshold and envelope shape, thus to indicate the weight classification of the vehicle detected.

3. The method of claim 2, wherein the processing step includes detecting the rate at which the density statistic number decreases to a quiescent level, thereby to be able to classify a detected vehicle as being either a heavy vehicle or a light vehicle.

4. The method of claim 1, wherein the standard deviation technique includes the step of estimating the standard deviation using an exponential average over time.

5. The method of claim 1, wherein the estimate is obtained using a bit-shift such that there is a computation that uses only adding and multiplication operations, thereby limiting power consumption in computing the estimate.

6. The method of claim 5, wherein the fidelity of the estimate is increased by exponentially averaging the background value over time.

7. The method of claim 6, wherein the background level is provided by s_avg_estimate(i)=(1/128)*(s_estimate+ 127*s_avg_estimate(i−1)) where s_avg_estimate is the moving average of s_estimate, whereby the exponential average can be computed using a bit-shift, thus to conserve computational power.

8. The method of claim 1, wherein in the processing step includes:
utilizing a number of different thresholds to detect the onset of vehicle presence and the end of a vehicle detection event.

9. The method of claim 1, wherein the background level set defines a noise background level, and wherein the processing step includes evaluating the background level over a number of time frames to update the background level over time, thereby providing an adaptable background level.

10. The method of claim 1, wherein the threshold is set a number of multiples over the background level to trigger vehicle detection.

11. The method of claim 10, wherein the threshold is set four times over that of the background level.

* * * * *